(12) United States Patent
Kanayama et al.

(10) Patent No.: US 7,038,139 B2
(45) Date of Patent: May 2, 2006

(54) SPIRAL CABLE DEVICE

(75) Inventors: Yukihiko Kanayama, Toyokawa (JP);
Morihiro Matsuda, Toyota (JP); Junji Kawamuro, Susono (JP); Shoichi Shono, Aichi-ken (JP); Yasunori Okada, Tokyo (JP)

(73) Assignees: Toyoda Koki Kabushiki Kaisha, Kariya (JP); The Furukawa Electric Co., Ltd., Tokyo (JP)

( * ) Notice: Subject to any disclaimer, the term of this patent is extended or adjusted under 35 U.S.C. 154(b) by 0 days.

(21) Appl. No.: 10/420,841

(22) Filed: Apr. 23, 2003

(65) Prior Publication Data

US 2003/0221862 A1    Dec. 4, 2003

(30) Foreign Application Priority Data

Apr. 26, 2002  (JP) .............................. 2002-126546

(51) Int. Cl.
*H01B 7/00*    (2006.01)

(52) U.S. Cl. .............................. 174/117 R; 174/117 F; 174/117 FF; 439/164

(58) Field of Classification Search .............. 174/74 R, 174/75 D, 79, 84 R, 86, 88 R, 117 F, 117 FF; 439/164, 15
See application file for complete search history.

(56) References Cited

U.S. PATENT DOCUMENTS

| 3,300,572 | A | * | 1/1967 | Dahlgren et al. ............. 174/69 |
| 3,818,122 | A | * | 6/1974 | Luetzow ...................... 174/86 |
| 4,808,773 | A | * | 2/1989 | Crandall ................... 174/113 R |
| 5,057,646 | A | * | 10/1991 | Nichols et al. ................ 174/36 |
| 5,226,831 | A | * | 7/1993 | Horiuchi ..................... 439/164 |
| 5,257,943 | A | * | 11/1993 | Ueno et al. .................. 439/164 |
| 5,310,356 | A | * | 5/1994 | Obata et al. ................. 439/169 |
| 5,342,991 | A | * | 8/1994 | Xu et al. ................. 174/117 R |
| 5,428,187 | A | * | 6/1995 | Crane et al. .................. 174/36 |
| 5,980,287 | A | * | 11/1999 | Sasaki ........................ 439/164 |
| 6,630,625 | B1 | * | 10/2003 | Akashi et al. ............ 174/72 A |
| 6,730,622 | B1 | * | 5/2004 | Curro et al. ................. 442/336 |
| 2002/0019150 | A1 | | 2/2002 | Kuki |
| 2002/0032974 | A1 | * | 3/2002 | McCrindle ................... 36/130 |

FOREIGN PATENT DOCUMENTS

| DE | 100 54 155 | | 6/2001 |
| EP | 1 069 657 A1 | * | 1/2001 |
| EP | 1 149 739 | | 10/2001 |
| EP | 1 160 132 | | 12/2001 |
| JP | 10-164745 | | 6/1998 |
| JP | 10164745 | | 6/1998 |
| JP | 2000-278827 A | * | 3/2000 |
| JP | 2001/076802 A | * | 3/2001 |
| WO | WO 01/03244 | | 1/2001 |

* cited by examiner

*Primary Examiner*—William H. Mayo, III
(74) *Attorney, Agent, or Firm*—Oblon, Spivak, McClelland, Maier & Neustadt, P.C.

(57) ABSTRACT

A spiral cable device is provided with a cylindrical casing, an inner cylinder rotatable relative to the cylindrical casing, and a flexible flat cable connected to the inner cylinder at one end thereof and to the cylindrical casing at the other end thereof. The flexible flat cable has plural leads arranged in a single layer and is folded to form multiple layers of the leads, so that even where the flexible flat cable is to have many leads, the spiral cable device can be made short in the axial direction thereof.

3 Claims, 5 Drawing Sheets

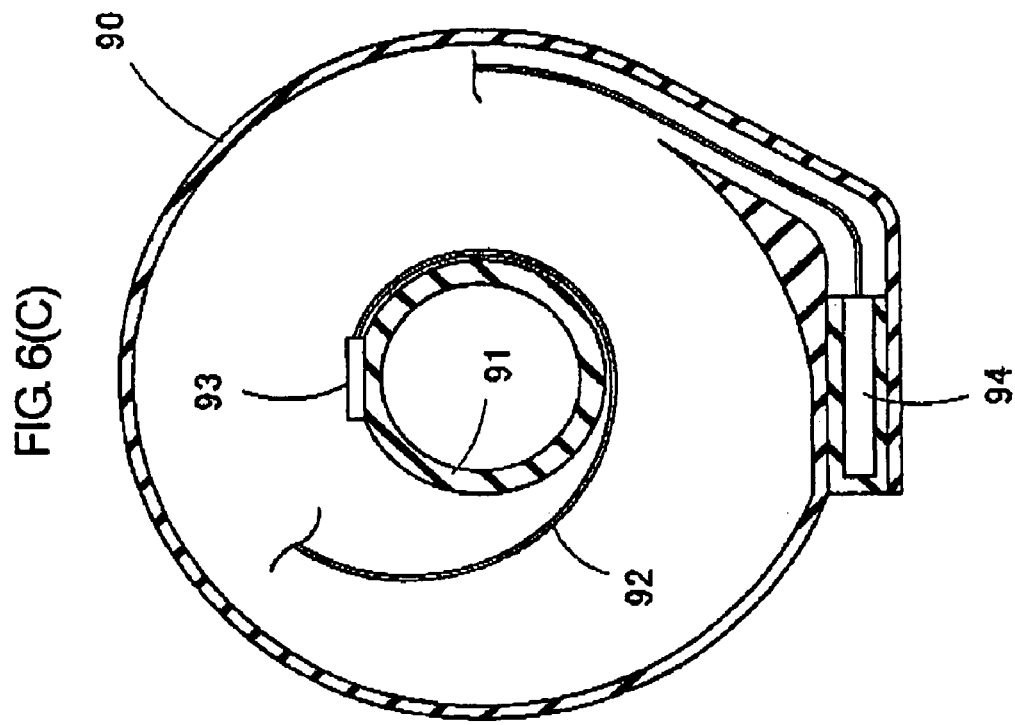
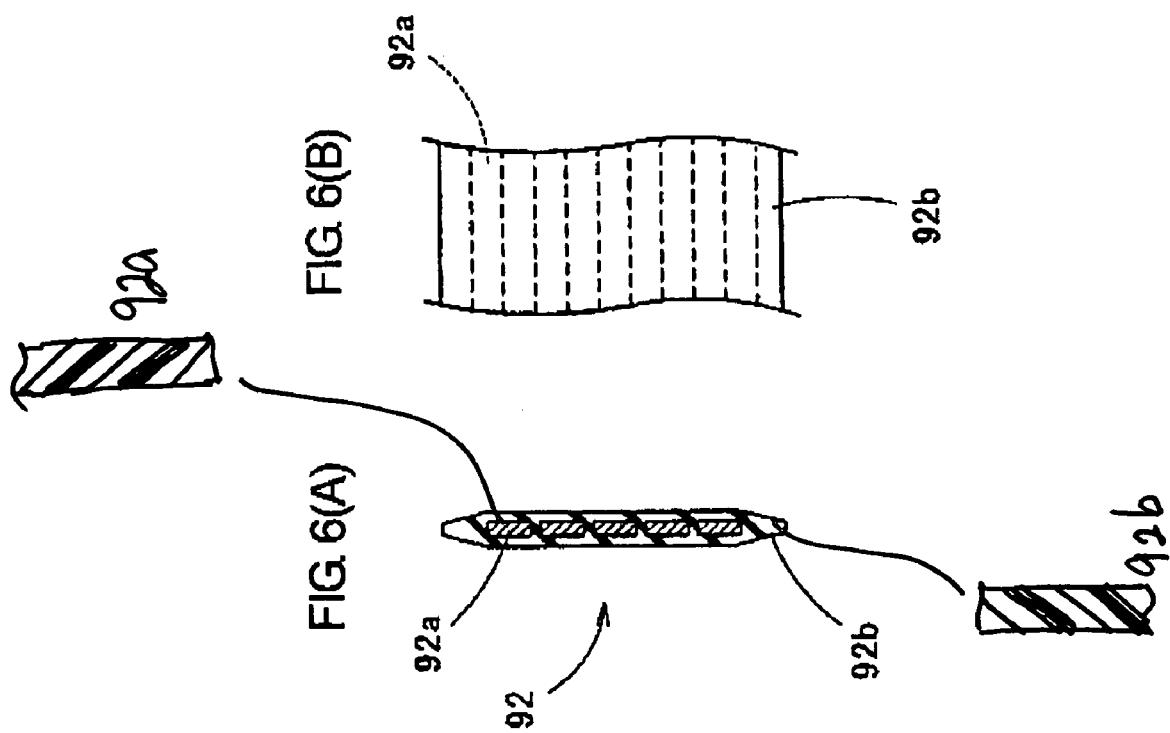

SPIRAL CABLE DEVICE

INCORPORATION BY REFERENCE

This application is based on and claims priority under 35 U.S.C. sctn. 119 with respect to Japanese Application No. 2002-126546 filed on Apr. 26, 2002, the entire content of which is incorporated herein by reference.

BACKGROUND OF THE INVENTION

1. Field of the Invention

The present invention relates to a spiral cable device, which is suitable for use in, for example, a variable gear ratio steering device of vehicles.

2. Discussion of the Related Art

Japanese unexamined, published patent application No. 10-164745 (1998-164745) discloses a prior art spiral cable device. As shown in FIG. 6(c), the cable device is provided with a cylindrical casing 90, an inner cylinder 91 rotatable relative to the cylindrical casing 90 within the same, and a flexible flat cable 92 connected to the inner cylinder 91 at one end thereof and to the cylindrical casing 90 at the other end thereof to be wound around the inner cylinder 91. As shown in FIGS. 6(A) and 6(B), the flexible flat cable 92 is composed of plural leads 92a which are coated with flexible resin 92b to be isolated electrically.

The spiral cable device is employed to electrically connect the members which are relatively rotatable with each other in a variable gear ration steering device, an air bag device or the like of vehicles. Where the spiral cable device is used in, for example, a variable gear ratio steering device of a vehicle, the cylindrical housing 90 is fixed to a vehicle body, while the inner cylinder 91 is fixed to a housing of the variable gear ratio steering device. Further, one end of the flexible flat cable 92 is connected to the inner cylinder 91 by means of a terminal 93, and leads extending from the inner cylinder 91 are connected to a stator of a motor or the like. On the other hand, the other end of the flexible flat cable 92 is connected to the cylindrical casing 90 by means of a terminal 94, and leads extending from the cylinder casing 90 are connected to a battery and an ECU (Electronic Control Unit) of the vehicle. In the spiral cable device, when the cylindrical casing 90 and the inner cylinder 91 are rotated relative to each other, the battery and the ECU are maintained connected electrically with the stator of the motor as long as the angle of the relative rotation therebetween is within the winding range of the flexible flat cable 92.

However, in the prior art spiral flat cable device, the flexible flat cable 92 arranges the plural leads 92a within a single layer and is wound to form only a single layer of the leads 92a in the radial direction of the winding. Thus, where the flexible flat cable 92 is of the type that the plural leads 92a are coated to be isolated electrically, the flexible flat cable is caused to be large in width so that the cylindrical casing 90 containing the flat cable 92 and the inner cylinder 91 are enlarged in the axial direction thereof. This disadvantageously causes the axial length of the spiral cable device to be enlarged. Therefore, when the spiral cable device were employed in the aforementioned variable gear ratio steering device, air bag device or the like of the vehicle, the axial length of the same would be enlarged thereby affecting the capability of being mounted on vehicles or the like.

SUMMARY OF THE INVENTION

Accordingly, it is a primary object of the present invention to provide an improved spiral cable device capable of being small in the axial length even where the flexible flat cable has many leads.

Briefly, according to the present invention, there is provided a spiral cable device having a cylindrical casing, an inner cylinder provided to be rotatable relative to the cylindrical casing within the same, and a flexible flat cable connected to the inner cylinder at one end thereof and to the cylindrical casing at the other end thereof and having plural leads coated to be isolated electrically, wherein the flexible flat cable has the leads arranged in a single layer, and wherein plural flexible flat cables each having the configuration as that defined above are placed to form multiple layers of the leads in the radial direction of the cylindrical casing.

In the device with this configuration, each of the flexible flat cables has a single layer of the leads and is overlapped with one another in the radial direction. This allows the number of the leads to be decreased per flexible flat cable. Therefore, even where the flat cable is to have many leads, the width of the flat cable can be made small, whereby the cylinder casing and hence, the spiral cable device can be diminished in length in the axial direction.

In another aspect of the present invention, the flexible flat cable has the leads arranged in a single layer and is folded to form multiple layers of the leads in the radial direction of the cylindrical casing.

With this construction, the flexible flat cable is folded to form multiple layers of the leads in the radial direction. This makes small the width which the flexible flat cable occupies within the cylindrical casing in the axial direction of the same. Consequently, the cylindrical casing and hence, the spiral cable device can be made small in the axial direction.

In a further aspect of the present invention, the flexible flat cable has the leads arranged in multiple layers in the radial direction of the cylindrical casing.

With this configuration, the number of the leads which are to be arranged in each layer in the axial direction of the spiral cable device can be reduced, whereby the width of the flexible flat cable can be made small. Consequently, the cylindrical casing and hence, the spiral cable device can be made small in the axial direction.

BRIEF DESCRIPTION OF THE ACCOMPANYING DRAWINGS

The foregoing and other objects and many of the attendant advantages of the present invention may readily be appreciated as the same becomes better understood by reference to the preferred embodiments of the present invention when considered in connection with the accompanying drawings, wherein like reference numerals designate the same or corresponding parts throughout several views, and in which.

Figure 3:
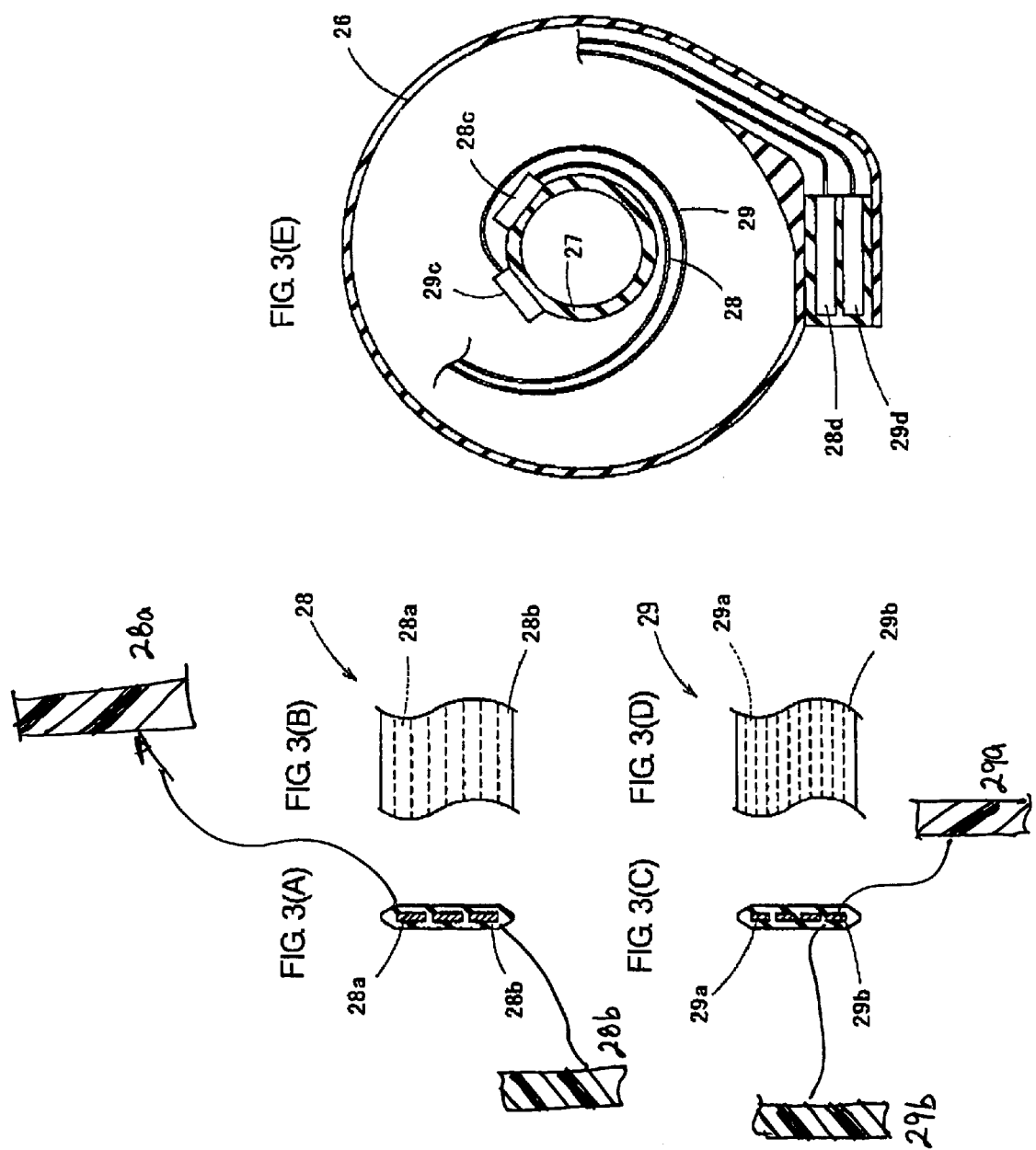

FIG. 3 shows a spiral cable device of the first embodiment, wherein FIG. 3(A) is a cross section of one flexible flat cable; FIG. 3(B) is a plan view of a part of the cable; FIG. 3(C) is a cross section of the other flexible flat cable; FIG.

Figure 2:
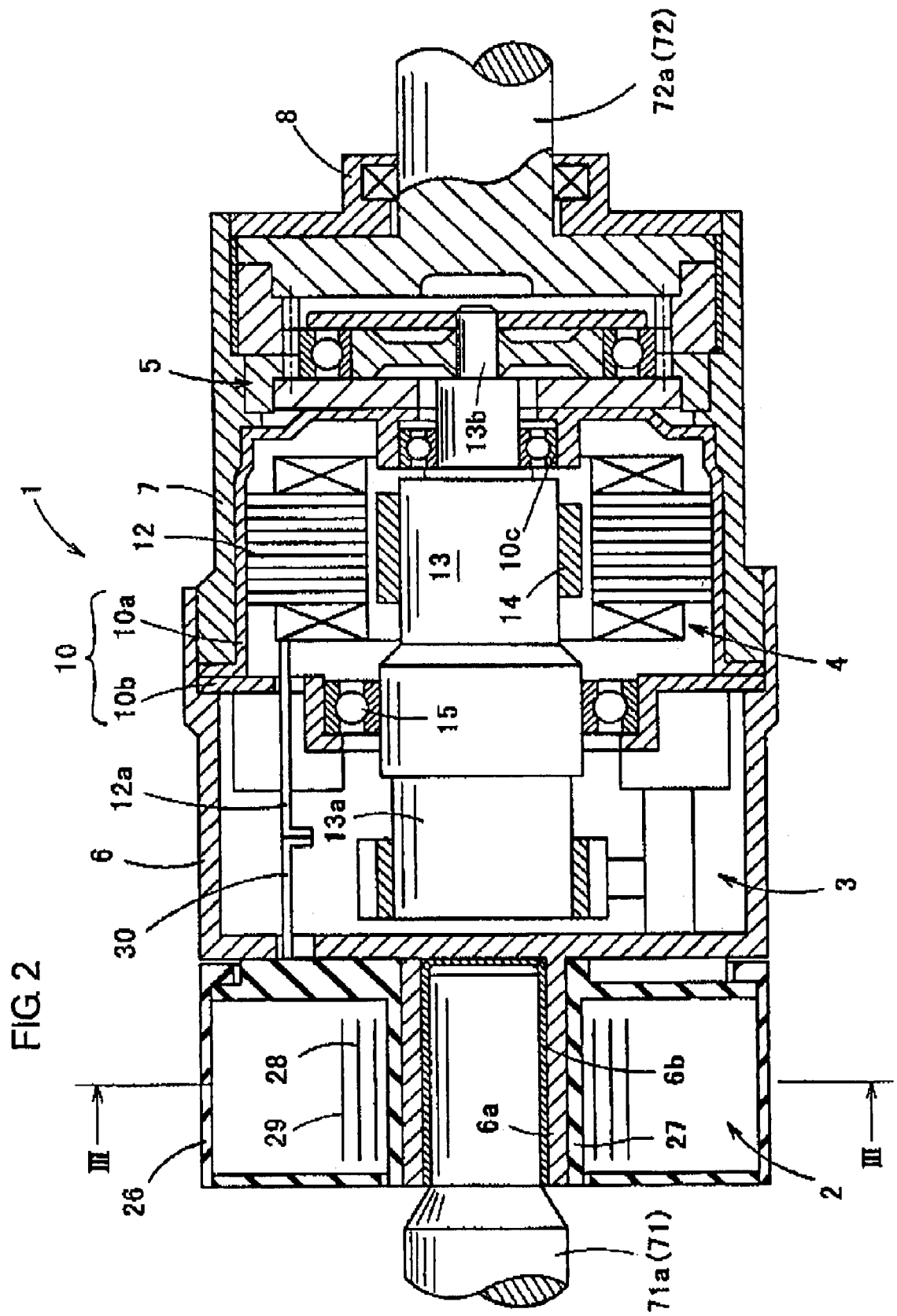
FIG. 2 is a longitudinal sectional view of a variable gear ratio steering device incorporating one of the first through third embodiments.
Figure 4:
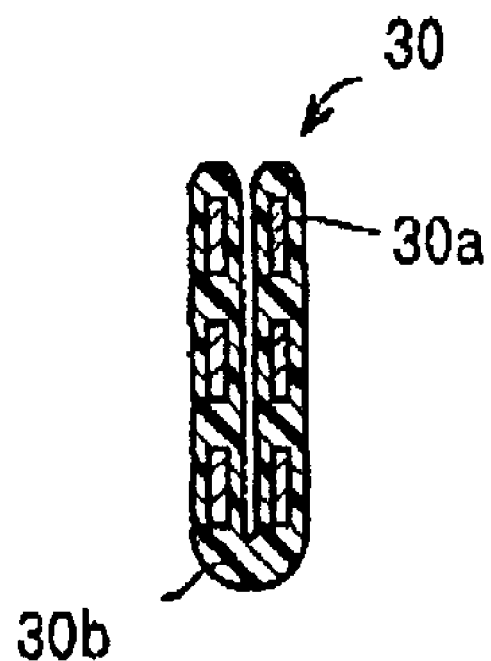
Figure 5:
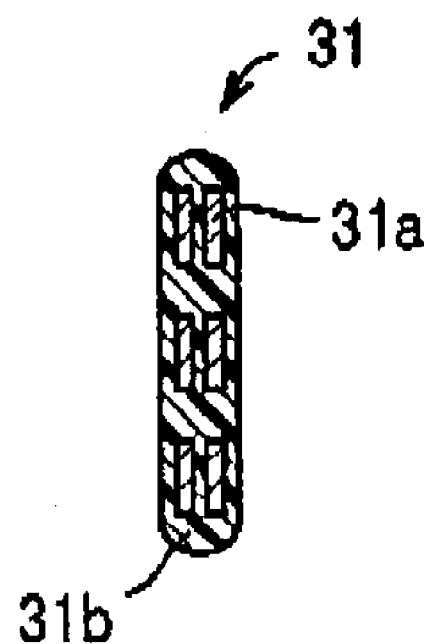

3(D) is a plan view of a part of the other cable; and FIG. 3(E) is the cross section of the spiral cable device taken along the line III—III in FIG. 2;

FIG. 4 is a cross section of a flexible flat cable according to the second embodiment of the present invention;

FIG. 5 is a cross section of a flexible flat cable according to the third embodiment of the present invention; and FIG. 6 shows a prior art spiral cable device, wherein FIG. 3(A) is a cross section of a flexible flat cable; FIG. 3(B) is a plan view of a part of the cable; and FIG. 3(C) is a cross section of the prior art spiral cable device corresponding to that shown in FIG. 3(E).

DETAILED DESCRIPTION OF THE PREFERRED EMBODIMENTS (First Embodiment)

Figure 1:
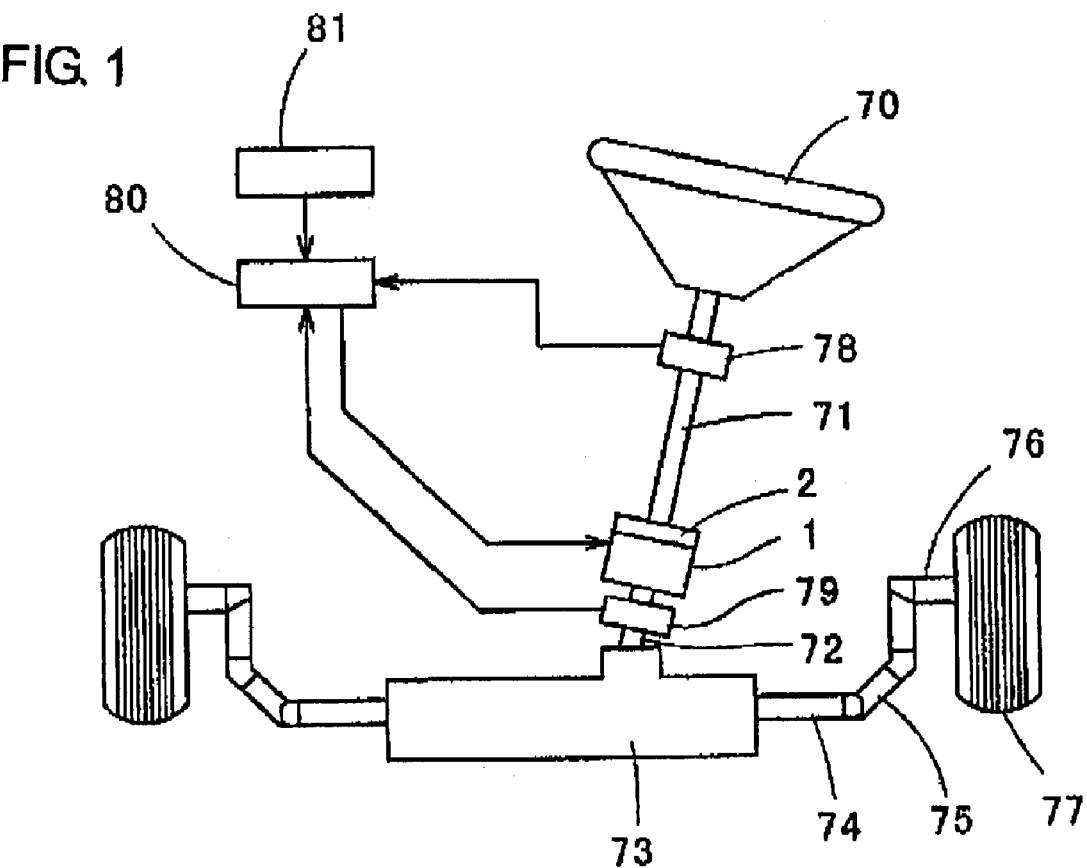
FIG. 1 is a schematic view of a steering system incorporating a spiral cable device according to one of first to third embodiments of the present invention.

A spiral cable device in the first embodiment embodies the first invention and is employed in a variable gear ratio steering device 1 of a steering system shown in FIG. 1. The steering system includes a steering wheel or handle 70 which is connected to the upper end of an upper steering shaft 71 constituting an input shaft, through a constant velocity joint (not shown). The lower end of the upper steering shaft 71 is connected to the upper end of a lower steering shaft 72 constituting an output shaft, through the variable gear ratio steering device 1. The lower end of the lower steering shaft 72 is provided through another constant velocity joint (not shown) with a pinion (not shown), which is in meshing engagement with a rack shaft 74 within a steering gear box 73. Opposite ends of the rack shaft 74 are connected to respective one ends of tie rods, whose other ends are connected to steered road wheels 77 through knuckle arms 76, respectively.

Further, the upper steering shaft 71 is provided thereon with a steering angle sensor 78 for detecting the steering angle of the steering handle 70, while the lower steering shaft 72 is provided thereon with a steered angle sensor 79 for detecting the steered angle of the steered road wheels 77. The steering angle of the steering handle 70 and the steered angle of the steered road wheels 77 which angles are detected respectively by the steering angle sensor 78 and the steered angle sensor 79 are input into an ECU (Electronic Control Unit) 80, to which there is also input a vehicle speed from a vehicle speed sensor 81 for detecting the vehicle speed. The ECU 80 outputs a control signal to the variable gear ratio steering device 1 for controlling the same.

FIG. 2 shows the detail of the variable gear ratio steering device 1 in an enlarged scale. The device 1 is provided with a lock mechanism 3, a motor 4 and a strain wave gearing mechanism 5 as a gear mechanism within housings 6–8 connected bodily. The device 1 is also provided with a spiral cable device 2 outside the housing 6. And, the lower end 71a of the upper steering shaft 71 and the upper end 72a of the lower steering shaft 72 are connected by the variable gear ratio steering device 1.

An insertion portion 6a is formed at a portion closer to the upper steering shaft 71 of the housing 6. The lower end 71a of the upper steering shaft 71 is inserted together with a leaf spring 6b into the insertion portion 6a, so that the housing 6 and the upper steering shaft 71 are secured to be rotatable bodily.

As also shown in FIG. 3(E), the spiral cable device 2 is provided with a cylindrical casing 26 made of resin which is supported on a vehicle body (not shown) and an inner cylinder 27 made of resin which is provided to be rotatable relative to the cylindrical casing 26 within the same and which is secured to the external surface of the insertion portion 6a. A first flexible flat cable 28 and a second flexible flat cable 29 are interposed between the cylindrical casing 26 and the inner cylinder 27 and are wound around the inner cylinder 27 to be arranged double in the radial direction of the casing 26, the cylinder 27 and the like. As shown in FIGS. 3(A) and 3(B), the first flexible flat cable 28 is composed of plural leads 28a which are arranged in a single layer and which are coated to be electrically isolated by means of a flexible PET (Polyethylene Terephthalate) film 28b. As shown in FIGS. 3(C) and 3(D), the second flexible flat cable 29 is composed of plural leads 29a which are arranged in a single layer and which are coated to be electrically isolated by means of a flexible PET film 29b.

The flexible flat cable 28 is provided for supplying the motor 4 and a drive device of the lock mechanism 3 with electric power, while the flexible flat cable 29 is provided for transmitting control signals output from the ECU 80 to the motor and the like. These flexible flat cables 28, 29 are connected at respective one ends thereof to the inner cylinder 27 by means of terminals 28c, 29c and at respective other ends thereof to the cylindrical casing 26 by means of terminals 28d, 29d. As shown in FIG. 2, each of the leads 30 extending from the inner cylinder 27 is connected to a bus bar 12a led out from the stator 12 or the like of the motor 4 by being welded to the bus bar 12a. On the other hand, each of the leads (not shown) extending from the cylindrical casing 26 is connected to a battery (not shown) and the ECU 80 (FIG. 1) through respective connectors.

Further, as shown in FIG. 2, the motor 4 has a motor housing 10 secured within the housing 7. The motor housing 10 is composed of a motor housing body 10a and a motor end plate 10b. The motor housing body 10a takes the form of a cup having a shaft hole 10c at the center thereof and is secured to the housing 7. At a portion close to the upper steering shaft 71 of the motor housing body 10a, the motor end plate 10b is secured to close an opening portion of the motor housing 10a. The stator 12 is fixed to the internal surface of the motor housing body 10a. A rotor 14 is provided within the stator 12 to be rotated by the same. The rotor 14 is fixed over a motor shaft 13, which axially extends from the opposite ends of the rotor 14. One end of the motor shaft 13 close to the spiral cable device 2 is able to be locked by the lock mechanism 3 onto the housings 6–8. The other end 13b of the motor shaft 13 is connected to the strain wave gearing mechanism 5.

(Operation)

In the spiral cable device 2 incorporated in the variable gear ration steering device 1 as constructed above, when the driver rotates steering handle 70 shown in FIG. 1, the inner cylinder 27 shown in FIGS. 2 and 3(E) is rotated relative to the cylindrical casing 26. Thus, the flexible flat cables 28, 29 are wound about, or wound off the inner cylinder 27. Since the relative rotational angle between the inner cylinder 27 and the cylindrical casing 26 is within the winding ranges of the flexible flat cables 28, 29, electrical connection can be kept between the ECU 80 and the motor 4 or the like.

Further, in the spiral cable device 2, the flexible flat cables 28, 29 are radially doubled to form multiple layers of leads 28a, 29a, and the number of the leads 28a or 29a per cable 28 or 29 is chosen to three (3) or four (4). Thus, in comparison with the prior art device wherein a flexible flat cable is radially single, the spiral cable device 2 of the embodiment is capable of having the widths of the flat cables 28, 29 reduced to almost the half and therefore, of making the cylindrical casing 26 and the inner cylinder 27 diminished in the axial direction thereof. Accordingly, the spiral cable device 2 of the embodiment can be short in the axial length, whereby the capability of the device being mounted on vehicles can be improved.

(Second Embodiment)

A spiral cable device in the second embodiment embodies the second invention. In the spiral cable device of the second embodiment, as shown in FIG. 4, there is employed a flexible flat cable 30, wherein plural leads 30a are arranged in a single layer and are coated to be isolated electrically by means of a PET film 30b having flexibility, and the flexible flat cable 30 is folded to be radially doubled within the cylindrical casing 26. That is, the cable 30 is folded to form multiple layers of the leads 30a. Other configurations of the second embodiment are the same to those in the first embodiment.

In the spiral cable device, the flexible flat cable 30 is folded to be radially doubled, i.e., to form multiple layers of the leads 30a. This makes small the width which the flexible flat cable 30 occupies within the cylindrical casing 26 in the axial direction of the same. Consequently, the cylindrical casing 26 can be made small in the axial direction, and the cable device 2 and the device (e.g., the variable gear ratio steering device 1) incorporating the same can also be made small in the axial direction thereof. Other functions and effects of the second embodiment are the same to those of the first embodiment.

(Third Embodiment)

A spiral cable device in the third embodiment embodies the third invention. In the spiral cable device of the third embodiment, as shown in FIG. 5, there is employed a flexible flat cable 31, wherein plural leads 31a are arranged in two layers and are coated to be isolated electrically by means of a PET film 31b having flexibility. Other configurations of the second embodiment are the same to those in the first embodiment.

In the spiral cable device, since the flexible flat cable 31 has the plural leads 31a arranged in the two layers in the radial direction, the number of the leads which are arranged in each layer in the axial direction of the spiral cable device 2 can be reduced to the half compared with that in the prior art device wherein all the leads are arranged in a single layer, whereby the width of the flexible flat cable 31 can be made small. Consequently, the cylindrical casing 26 can be made small in the axial direction, and thus, the cable device 2 and the device (e.g., the variable gear ratio steering device 1) incorporating the same can also be made small in the axial direction thereof. Other functions and effects of the third embodiment are the same to those of the first embodiment.

As described hereinabove, in the spiral cable device according to any of the first to third embodiments, the axial length of the spiral cable device can be made short even where the flexible flat cable has plural leads. Accordingly, where the spiral cable device is employed in, for example, a variable gear ratio steering device, an air bag device or the like, an excellent capability can be realized in mounting any of these devices on a vehicle.

Obviously, numerous modifications and variations of the present invention are possible in light of the above teachings. It is therefore to be understood that within the scope of the appended claims, the present invention may be practiced otherwise than as specifically described herein.

What is claimed to be secured by the Letters Patent of the United States is:

1. A spiral cable device comprising:
    a cylindrical casing;
    an inner cylinder provided to be rotatable relative to the cylindrical casing within the same; and
    a first flexible flat cable and a second flexible flat cable each connected to the inner cylinder at one end thereof for being wound around the same and to the cylindrical casing at the other end thereof and having plural leads coated to be isolated electrically, wherein,
    each of the first flexible flat cable and second flexible flat cable have has the leads arranged in a single layer,
    the respective flexible flat cables, are placed to form multiple layers of the leads in the radial direction of the cylindrical casing, and
    the leads arranged in the single layer of the first flexible flat cable are provided for supplying electric power to drive an actuator, while the leads arranged in the single layer of the second flexible cable are provided for transmitting control signals, a cross-sectional area of respective leads in the first flexible flat cable is larger than that of the respective leads for the second flexible flat cable.

2. A spiral cable device combined with a variable gear ratio steering device of the type which is provided between upper and lower steering shafts connected respectively to a steering handle and a steering gear box and which includes a motor and a gear mechanism received in a housing rotatable bodily with the upper steering shaft for transmitting the rotational movement of the upper steering shaft to the lower steering shaft at variable gear ratios, the spiral cable device being coaxially provided outside the housing and comprising:
    a cylindrical casing supported on a vehicle body;
    an inner cylinder provided to be rotatable relative to the cylindrical casing within the same; and
    first and second flexible flat cables each connected to the inner cylinder at one end thereof for being wound around the same and to the cylindrical casing at the other end thereof and each having plural leads coated to be isolated electrically, wherein,
    the first and second flexible flat cables are placed to form multiple layers of the leads in the radial direction of the cylindrical casing, and
    the plural leads in the first flexible flat cable are provided for supplying the motor with electric power, while the plural leads in the second flexible flat cable are provided for transmitting control signals to the motor, a cross-sectional area of respective leads in the first flexible flat cable is larger than that of the respective leads for the second flexible flat cable.

3. The spiral cable device combined with the variable gear ratio steering device as set forth in claim 2, wherein:
    the variable gear ratio steering device further includes a lock mechanism received in the housing for locking a motor shaft of the motor against rotation when electrically operated; and
    the plural leads in the first flexible flat cable supplies electric power to the lock mechanism to operate the same electrically.

* * * * *